(12) United States Patent
Kaiser et al.

(10) Patent No.: US 11,960,265 B2
(45) Date of Patent: Apr. 16, 2024

(54) METHOD FOR ADAPTING AN APPARATUS TO A MOTOR-DRIVEN TOOL, METHOD FOR OPERATING AN APPARATUS IN A TYPE-DEPENDENT MANNER, APPARATUS FOR ADAPTATION TO A MOTOR-DRIVEN TOOL, AND SYSTEM

(71) Applicant: Andreas Stihl AG & Co. KG, Waiblingen (DE)

(72) Inventors: Michael Kaiser, Waiblingen (DE); Andre Vaas, Jagstzell (DE); Kay-Steffen Gurr, Heilbronn (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/100,215

(22) Filed: Nov. 20, 2020

(65) Prior Publication Data

US 2021/0157297 A1 May 27, 2021

(30) Foreign Application Priority Data

Nov. 22, 2019 (EP) .................................... 19210898

(51) Int. Cl.
*G05B 19/4065* (2006.01)
(52) U.S. Cl.
CPC .................... *G05B 19/4065* (2013.01); *G05B 2219/32118* (2013.01)

(58) Field of Classification Search
CPC ....... G05B 19/4065; G05B 2219/32118; B25F 5/00; G06F 16/25; G06F 16/245; A01B 71/00
See application file for complete search history.

(56) References Cited

U.S. PATENT DOCUMENTS

| 9,878,432 | B2 | 1/2018 | Linehan et al. |
| 2014/0025834 | A1 | 1/2014 | Mergener |
| 2014/0070924 | A1 | 3/2014 | Wenger et al. |
| 2014/0184397 | A1* | 7/2014 | Volpert .................. G05B 19/05 340/12.51 |
| 2016/0373457 | A1* | 12/2016 | Matson .................. H04L 67/306 |
| 2017/0216986 | A1* | 8/2017 | Dey, IV .................... B25F 5/00 |
| 2019/0043292 | A1* | 2/2019 | Hoossainy ............... G07C 9/30 |
| 2019/0143495 | A1* | 5/2019 | Mergener .............. H02J 7/0024 318/139 |

FOREIGN PATENT DOCUMENTS

DE 10 2017 204 150 A1 9/2018
EP 2 521 206 A1 11/2012

* cited by examiner

*Primary Examiner* — Eric J Yoon
*Assistant Examiner* — Mohammed Shafayet
(74) *Attorney, Agent, or Firm* — Crowell & Moring LLP

(57) ABSTRACT

A method adapts an apparatus to a motor-driven tool from a set of different types of motor-driven tools. The apparatus is arranged on the tool. The method has the steps of: capturing an identifier of the tool by way of the apparatus, and transmitting an item of type-specific configuration information from a database to the apparatus on the basis of the captured identifier in such a manner that the apparatus is designed to process operating data of the tool in a type-specific manner.

17 Claims, 4 Drawing Sheets

| INPUT + PROCESSING | | | | OUTPUT | | | | | | | | |
|---|---|---|---|---|---|---|---|---|---|---|---|---|
| DN | DT | DA | Internal Processing Algorithm | Output Action trigger | Output Action Store Event Type | | | | | LED Color | | |
| | | | | | Error | Maintenance | Usage | MISC | Red | Yellow | Continuous | Blinking |
| Battery voltage high byte pos | 8-bit | 0x02 | | | | | | X | | X | X | |
| Battery voltage low byte pos | 8-bit | 1000 | | | | | | | | | | |
| Battery voltage factor | 16-bit | Master | | | | | | | | | | |
| Source | Typedef | Master | Compare to saved serial number | Current serial number != saved serial number | | | | | | | | |
| Command value | 8-bit | 0x12 | | | | | | | | | | |
| Message ID | 8-bit | 0x23 | | | | | | | | | | |
| Serial number high byte pos | 8-bit | 0x34 | | | | | | | | | | |
| Serial number low byte pos | 8-bit | 0x45 | | | | | | | | | | | sDF
DG

METHOD FOR ADAPTING AN APPARATUS TO A MOTOR-DRIVEN TOOL, METHOD FOR OPERATING AN APPARATUS IN A TYPE-DEPENDENT MANNER, APPARATUS FOR ADAPTATION TO A MOTOR-DRIVEN TOOL, AND SYSTEM

CROSS REFERENCE TO RELATED APPLICATION

This application claims priority under 35 U.S.C. § 119 from European Patent Application No. 19210898.3, filed Nov. 22, 2019, the entire disclosure of which is herein expressly incorporated by reference.

BACKGROUND AND SUMMARY OF THE INVENTION

The invention relates to a method for adapting an apparatus to a motor-driven tool from a set of different types of motor-driven tools, to a method for operating an apparatus in a type-dependent manner, wherein the apparatus is arranged on a motor-driven tool from a set of different types of motor-driven tools, wherein the method comprises such a method for adapting the apparatus to the tool, to an apparatus for adaptation to a motor-driven tool from a set of different types of motor-driven tools, and to a system having such an apparatus.

The invention is based on the object of providing a method for adapting an apparatus to a motor-driven tool from a set of different types of motor-driven tools, in particular wherein the method has improved properties. The invention is also based on the object of providing a method for operating an apparatus in a type-dependent manner, wherein the apparatus is arranged on a motor-driven tool from a set of different types of motor-driven tools, wherein the method comprises such a method for adapting the apparatus to the tool, an apparatus for adaptation to a motor-driven tool from a set of different types of motor-driven tools, and a system having such an apparatus.

The invention achieves this object by providing a method, an apparatus and a system, according to the independent claims. Advantageous developments and/or configurations of the invention are described in the dependent claims.

The method, in particular automatic method, according to the invention for adapting an apparatus, in particular automatically and/or using software, to a motor-driven tool from a set of different types of motor-driven tools, wherein the apparatus is arranged on, in particular in, the tool or is mechanically connected to the latter, has the steps of: a) capturing, in particular automatically capturing, an identifier, in particular a value of the identifier, of the tool by means of the apparatus; b) transmitting, in particular automatically transmitting, an item of type-specific configuration information from a database, in particular a cloud, to the apparatus on the basis of the captured identifier in such a manner that the apparatus is designed or configured to process operating data, in particular values of the operating data, of the tool in a type-specific manner.

The method makes it possible for the apparatus to not need to be adapted to the tool when delivered from the factory. In other words: the method makes it possible for the apparatus to not need to be delivered from the factory having an item of type-specific configuration information from a set of different items of type-specific configuration information and therefore in different types or variants. Expressed differently: the method makes it possible for the apparatus to be able to be delivered from the factory in only a single variant or in a standard form. This makes it possible for a user to be able to procure the apparatus without needing to heed the type of tool.

Additionally or alternatively, the method enables adaptation without intervention, in particular information, from the user.

Further additionally or alternatively, the method, in particular the transmission of the type-specific configuration information or the design of the apparatus for processing in a type-specific manner, enables a type-specific functionality of the apparatus. This, in particular the design for processing in a type-specific manner, makes it possible for the apparatus to not need to forward the operating data of the tool without processing. In other words: this makes it possible to keep a volume of data to be transmitted from the apparatus low.

In particular, when delivered from the factory, the apparatus may have an item of non-type-specific configuration information or an item of basic configuration information or a basic functionality in such a manner that the apparatus can be designed to capture the identifier. Additionally or alternatively, the arrangement on, in particular in, the tool may make it possible to capture the identifier. Further additionally or alternatively, the identifier may have an item of information for uniquely identifying the tool or the type of tool.

Step b) can be carried out after step a) in terms of time.

The type-specific configuration information may be transmitted wirelessly. Additionally or alternatively, step b) may comprise: transmitting the captured identifier, or an item of identifier information determined or selected by means of the apparatus on the basis of the captured identifier, from the apparatus to the database. Further additionally or alternatively, step b) may comprise: determining or selecting the type-specific configuration information, in particular from a set of different items of type-specific configuration information, on the basis of the transmitted identifier or the transmitted identifier information by means of the database. Further additionally or alternatively, step b) may comprise: transmitting the determined or selected type-specific configuration information from the database to the apparatus. Further additionally or alternatively, step b) may comprise: implementing the type-specific configuration information by means of or on the apparatus. Further additionally or alternatively, the type-specific configuration information may be assigned to the identifier or to the identifier information, in particular in the database. Further additionally or alternatively, the type-specific configuration information can be referred to as a type-specific configuration file. Further additionally or alternatively, the type-specific configuration information may be in an appropriate version. Further additionally or alternatively, type-specific may have different meanings for the different types of tools.

The tool may be a hand-operated, in particular handheld or floor-guided, tool. In particular, a hand-operated, in particular handheld, tool may mean that the tool may have a mass of at most 50 kilogrammes (kg), in particular of at most 20 kg, in particular of at most 10 kg. Additionally or alternatively, the tool may be a gardening and/or forestry tool or a soil cultivation tool.

The apparatus may differ from the tool. Additionally or alternatively, the database may differ from the tool and/or the apparatus. Further additionally or alternatively, the identifier may differ from the operating data. Further additionally or alternatively, the configuration information may differ from the identifier and/or the identifier information, if available, and/or the operating data.

The apparatus may be coupled to the tool, in particular mechanically, or can be fitted or fastened on, in particular in, the tool. In particular, the apparatus may be connected to the tool, in particular releasably, in particular by means of a material bond, such as an adhesive bond, a force-fitting connection, such as a latching or snap connection, and/or a form-fitting connection, such as a screw connection. Additionally or alternatively, the apparatus may be in direct contact with the tool.

The apparatus may be part of the tool.

In one development of the invention, the apparatus is designed or configured to be separate from the tool. This makes it possible to retrofit the apparatus to the tool, in particular after the tool has been delivered from the factory in terms of time. In particular, the apparatus may be referred to as a unit. Additionally or alternatively, the device may be part of a rechargeable battery, in particular a rechargeable battery pack, for the tool, in particular for supplying the tool with drive current, in particular in the form of a rechargeable battery tool.

In one development of the invention, the identifier has a type number and/or a serial number. In particular, the identifier is a type number or a serial number.

The identifier can be captured wirelessly. In particular, the apparatus can ask the tool for the identifier.

In one development of the invention, the apparatus is connected to the tool by means of a cable for capturing the identifier, in particular including the operating data. Step a) comprises: capturing the identifier by means of the cable. This makes it possible to easily capture the identifier, in particular including the operating data.

The tool may have a motor control unit. The cable can be directly connected to the motor control unit.

In one configuration of the invention, the tool is a rechargeable battery tool, has a rechargeable battery interface, in particular a non-type-specific rechargeable battery interface, and is connected to a rechargeable battery, in particular a non-type-specific rechargeable battery, in particular for supplying drive current, in particular to a drive motor of the tool, by means of the rechargeable battery interface. The identifier, in particular including the operating data, is transmitted between the rechargeable battery tool and the rechargeable battery via the rechargeable battery interface, in particular a communication line of the rechargeable battery interface. The cable is connected to the rechargeable battery interface or to a bus of the tool for the rechargeable battery interface. This makes it possible to easily capture the identifier, in particular including the operating data, in particular if the apparatus is designed to be separate from the tool or if the apparatus is retrofitted. In particular, the apparatus may differ from the rechargeable battery.

In one development of the invention, the operating data of the tool are in a type-specific data format. The type-specific processing comprises understanding or interpreting the operating data in the type-specific data format.

Additionally or alternatively, the type-specific processing comprises type-specific evaluation of the operating data.

Further additionally or alternatively, the type-specific processing comprises type-specific storage of the operating data.

The type-specific data format makes it possible to keep a volume of the operating data of the tool low. Additionally or alternatively, the understanding of the operating data in the type-specific data format enables evaluation, in particular the type-specific evaluation, and/or storage, in particular the type-specific storage, of the operating data by means of the apparatus. Further additionally or alternatively, the type-specific evaluation of the operating data enables the type-specific functionality of the apparatus, in particular the fact that the apparatus does not need to forward the operating data of the tool without evaluation, and/or storage of operating data relevant to the user and/or non-storage of operating data irrelevant to the user by means of the apparatus. Further additionally or alternatively, the type-specific storage makes it possible to keep a volume of data to be stored, in particular operating data, low.

In particular, the identifier may be in a non-type-specific data format. Additionally or alternatively, the apparatus may be designed to understand the identifier, in particular when delivered from the factory. In particular, step a) may comprise: understanding the identifier.

In one configuration of the invention, the configuration information for understanding has an item of information for finding and/or detecting the operating data of the tool, in particular in interface data of the rechargeable battery interface, in particular an item of information relating to a data address, a data name, a data type, a data value and/or a data size.

Additionally or alternatively, the configuration information for type-specific evaluation has an item of information relating to at least one type-specific operating data value, in particular at least one type-specific operating data limit value, in particular for creating operating data statistics and/or for detecting and/or storing a fault of the tool and/or for outputting, in particular in a manner which can be perceived by a user, and/or transmitting an item of evaluation information evaluated from the operating data.

Further additionally or alternatively, the configuration information for type-specific storage has an item of information for storing or not storing operating data which cannot be understood and/or evaluated.

In particular, the identifier in the non-type-specific data format may have a non-type-specific data address. Additionally or alternatively, the apparatus may be designed to find and/or detect the identifier, in particular when delivered from the factory.

In one development of the invention, the operating data have a speed of a drive motor of the tool, a motor current of the drive motor, a temperature of the tool, in particular of the drive motor, a rechargeable battery voltage of a, in particular the, rechargeable battery connected to the tool captured by means of the tool, an item of status information relating to the tool and/or an item of fault information relating to the tool.

In one development of the invention, the tool is a saw or a pole pruner or hedge shears or a hedge cutter or a woodcutter or branch shears or a blower or a leaf blower or an aspirator or a leaf aspirator or a cleaning device or a high-pressure cleaner or a sweeper roller or a sweeper brush or a lawnmower or a brush cutter or a scarifier. Expressed differently: the set of different types of tools may comprise a saw or a pole pruner or hedge shears or a hedge cutter or a woodcutter or branch shears or a blower or a leaf blower or an aspirator or a leaf aspirator or a cleaning device or a high-pressure cleaner or a sweeper roller or a sweeper brush or a lawnmower or a brush cutter or a scarifier.

In one development of the invention, the method has the steps of: storing, in particular automatically storing, the captured identifier, or an, in particular the, item of identifier information determined or selected by means of the apparatus on the basis of the captured identifier, in the apparatus. Repeatedly capturing, in particular automatically capturing, an, in particular the, identifier of a, in particular the, motor-driven tool from the set of different types of motor-driven tools by means of the apparatus, wherein the apparatus is arranged on, in particular in, the tool or is mechanically connected to the latter. Comparing, in particular automatically comparing, the repeatedly captured identifier or an item of identifier information determined or selected by means of the apparatus on the basis of the repeatedly captured identifier and the stored identifier or the stored identifier information with one another by means of the apparatus. Outputting, in particular in a manner which can be perceived by a user and/or automatically outputting, and/or transmitting, in particular automatically transmitting, an item of comparison result information on the basis of a result of the comparison by means of the apparatus. This makes it possible to detect and/or perceive a changed arrangement from the tool, in particular the original tool, to another or new tool, in particular by the user. This makes it possible to trigger and/or enable adaptation, in particular new adaptation, of the apparatus to the other tool, in particular by the user. In particular, the comparison result information can be output and/or transmitted if the result of the comparison is that the repeatedly captured identifier or the identifier information determined on the basis of the repeatedly captured identifier and the stored identifier or the stored identifier information are not the same.

In one development of the invention, step b) comprises: transmitting the captured identifier, or an, in particular the, item of identifier information determined by means of the apparatus on the basis of the captured identifier, from the apparatus to a terminal, in particular a mobile terminal, and from the terminal to the database.

Additionally or alternatively, step b) comprises: transmitting the type-specific configuration information from the database to the terminal and from the terminal to the apparatus.

This makes it possible for the apparatus to be able to be designed or to need to transmit, in particular only, over a short distance such as for Bluetooth transmission or for WLAN transmission. In particular, the terminal can be referred to as a gateway. Additionally or alternatively, the mobile terminal may be a laptop, a tablet or a smartphone. Additionally or alternatively, mobile can be referred to as portable or hand-operated, in particular handheld. Further additionally or alternatively, the terminal may differ from the apparatus, the database and/or the tool.

The method, in particular automatic method, according to the invention for operating, in particular automatically operating, an, in particular the, apparatus in a type-dependent manner, wherein the apparatus is arranged on, in particular in, a, in particular the, motor-driven tool from a, in particular the, set of different types of motor-driven tools or is mechanically connected thereto, comprises: a, in particular the, method as described above for adapting the apparatus to the tool. Furthermore, the method for operating the apparatus in a type-dependent manner has the step of: capturing, in particular automatically capturing, the operating data of the tool, in particular by means of the cable, if present, and processing, in particular automatically processing, the captured operating data, in particular values of the operating data, in a type-specific manner by means of the apparatus.

The arrangement on, in particular in, the tool may make it possible to capture the operating data. Additionally or alternatively, the type-dependent operation and/or the type-specific processing may be different for the different types of tools. Further additionally or alternatively, the method for operating the apparatus in a type-dependent manner may have the step of: creating operating data statistics, in particular the operating data statistics, and/or detecting and/or storing a, in particular the, fault of the tool and/or outputting, in particular in a manner which can be perceived by a user, and/or transmitting an, in particular the, item of evaluation information evaluated from the operating data by means of the apparatus.

The apparatus, in particular electrical apparatus, according to the invention is designed or configured for adaptation to a, in particular the, motor-driven tool from a, in particular the, set of different types of motor-driven tools. The apparatus is designed or configured for arrangement on, in particular in, the tool. Furthermore, the apparatus is designed or configured to capture an, in particular the, identifier of the tool. In addition, the apparatus is designed or configured to transmit an, in particular the, item of type-specific configuration information, in particular from a, in particular the, database, to the apparatus on the basis of the captured identifier in such a manner that the apparatus is designed or configured to process operating data, in particular the operating data, of the tool in a type-specific manner.

In particular, the apparatus may be designed to capture the operating data of the tool. Additionally or alternatively, the apparatus may be designed to carry out at least one part of the method as described above for adaptation and/or type-dependent operation.

The system, in particular electrical system, according to the invention has an, in particular the, apparatus as described above.

In addition, the system has a, in particular the and/or an electronic, database. The system is designed or configured to transmit the type-specific configuration information from the database, in particular to the apparatus, on the basis of the captured identifier.

Additionally or alternatively, the system has the tool.

Further additionally or alternatively, the system has a, in particular the, terminal.

In particular, the system may be designed to carry out at least one part of the method, in particular the complete method, as described above for adaptation and/or type-dependent operation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
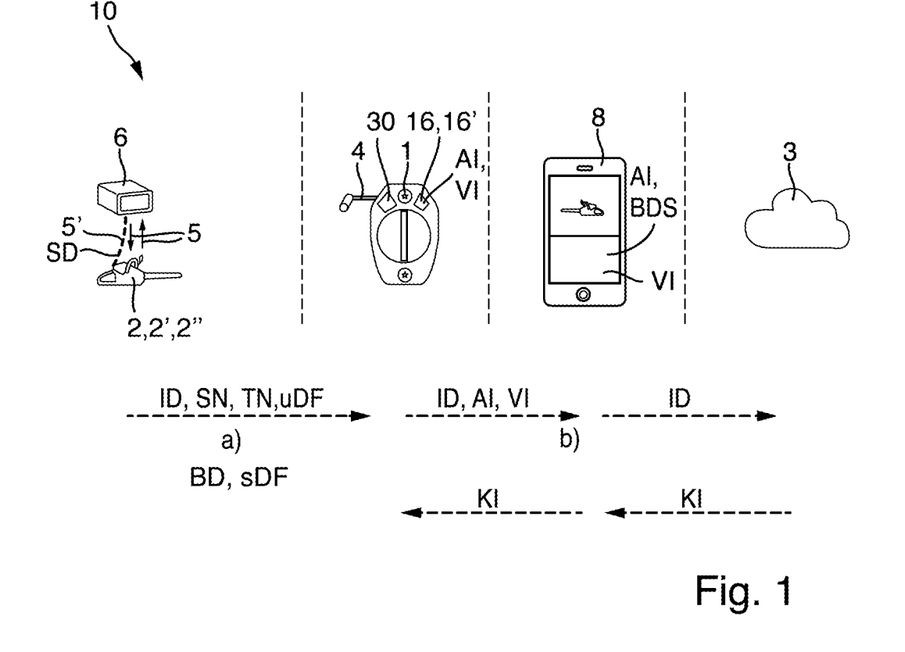
FIG. 1 is a schematic view of an exemplary system having an exemplary apparatus and a motor-driven tool, and of an exemplary method for operating the apparatus in a type-dependent manner including an exemplary method for adapting the apparatus to the tool.
Figure 2:
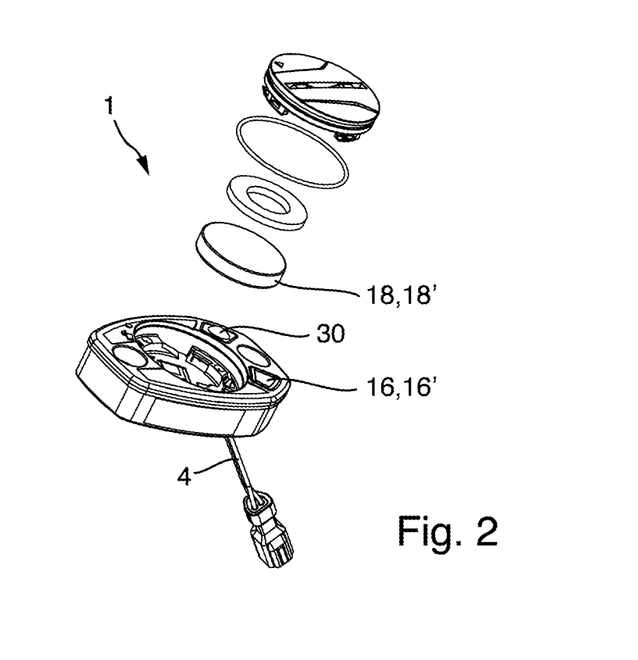
FIG. 2 is a schematic exploded view of the apparatus from FIG. 1.
Figure 3:
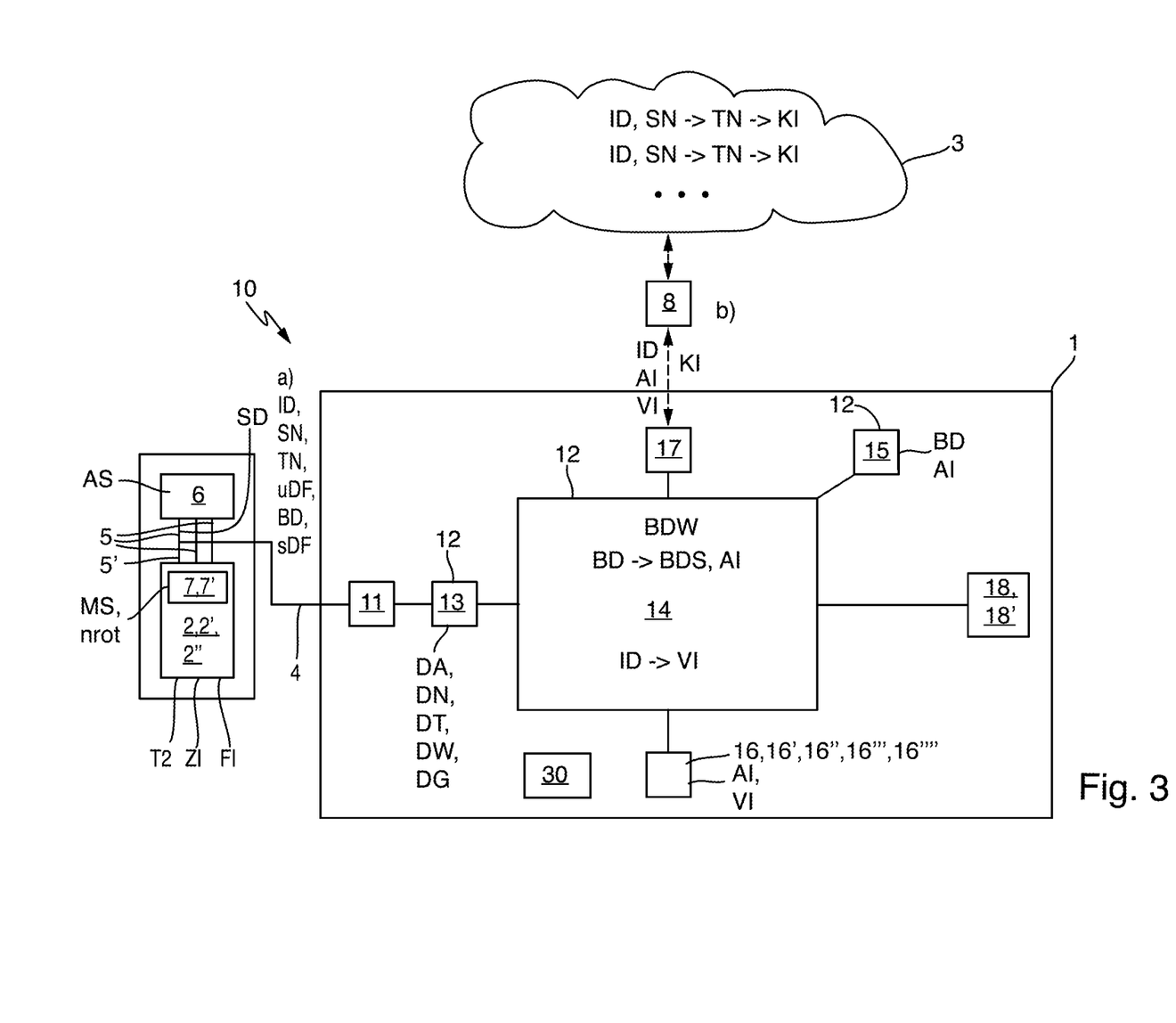
FIG. 3 is a schematic block diagram of the system and of the method from FIG. 1.

FIGS. 1 to 3 show a system 10. The system has an apparatus 1. The system 10 additionally has a database 3, in a cloud in the exemplary embodiment shown. Further additionally, the system 10 has a motor-driven tool 2.

In the exemplary embodiment shown, the system 10 has a terminal 8, in particular a mobile terminal, in particular in the form of a smartphone.

The apparatus 1 is designed for adaptation to the motor-driven tool from a set of different types of motor-driven tools 2. The apparatus 1 is designed for arrangement on the tool 2. Furthermore, the apparatus 1 is designed to capture an identifier ID of the tool 2. In addition, the apparatus 1 is designed to transmit, in particular wirelessly transmit, an item of type-specific configuration information KI, in particular from the database 3, to the apparatus 1 on the basis of the captured identifier ID in such a manner that the apparatus 1 is designed to process operating data BD of the tool 2 in a type-specific manner.

In the exemplary embodiment shown, the apparatus 1 is designed to capture the operating data BD of the tool 2.

The system 10 is designed to transmit, in particular wirelessly transmit, the type-specific configuration information KI from the database 3, in particular to the apparatus 1, on the basis of the captured identifier ID.

FIGS. 1 to 3 also show a method for operating the apparatus 1 in a type-dependent manner. The apparatus is arranged on the motor-driven tool 2 from the set of different types of motor-driven tools 2. The method adapts the apparatus 1 to the motor-driven tool 2 from the set of different types of motor-driven tools 2. The apparatus 1 is arranged on the tool 2. The method has the steps of: a) capturing the identifier ID of the tool 2 by means of the apparatus 1; and b) transmitting, in particular wirelessly transmitting, the type-specific configuration information KI from the database 3 to the apparatus 1 on the basis of the captured identifier ID in such a manner that the apparatus 1 is designed to process the operating data BD of the tool 2 in a type-specific manner.

The method for operating the apparatus 1 in a type-dependent manner also has the step of: capturing the operating data BD of the tool 2 and processing the captured operating data BD in a type-specific manner by means of the apparatus 1.

In the exemplary embodiment shown, the apparatus 1 is designed to be separate from the tool 2.

Furthermore, in the exemplary embodiment shown, the apparatus 1 is connected to the tool 2 by means of a cable 4 for capturing the identifier ID, in particular including the operating data BD. Step a) comprises: capturing the identifier ID by means of the cable 4. In alternative exemplary embodiments, the identifier and/or the operating data may be captured wirelessly.

In detail, the tool 2 is a rechargeable battery tool 2'. The tool 2 also has a rechargeable battery interface 5, in particular a non-type-specific rechargeable battery interface. The tool 2 is also connected to a rechargeable battery 6, in particular a non-type-specific rechargeable battery, in particular for supplying drive current, in particular to a drive motor 7 of the tool 2, by means of the rechargeable battery interface 5. The identifier ID, in particular including the operating data BD, is transmitted between the rechargeable battery tool 2' and the rechargeable battery 6 via the rechargeable battery interface 5, in particular a communication line 5' of the rechargeable battery interface 5. The cable 4 is connected to the rechargeable battery interface 5 or to a bus of the tool 2 for the rechargeable battery interface 5.

In the exemplary embodiment shown, the drive motor 7 is an electric drive motor 7'. In alternative exemplary embodiments, the drive motor of the tool may be an internal combustion drive engine.

In particular, the apparatus 1 has a capture device 11. The capture device 11 is designed to capture the identifier ID and/or the operating data BD of the tool 2.

The apparatus 1 also has a processing device 12. The processing device 12 is designed to process the operating data BD of the tool 2 in a type-specific manner.

Furthermore, the operating data BD of the tool 2 are in a type-specific data format sDF. The type-specific processing comprises understanding the, in particular captured, operating data BD in the type-specific data format sDF, in particular by means of an understanding device 13 of the processing device 12.

In addition, the type-specific processing comprises type-specific evaluation of the, in particular understood, operating data BD, in particular by means of an evaluation device 14 of the processing device 12.

Further additionally, the type-specific processing comprises type-specific storage of the, in particular evaluated, operating data BD, in particular by means of a storage device 15 of the processing device 12.

Figure 4:
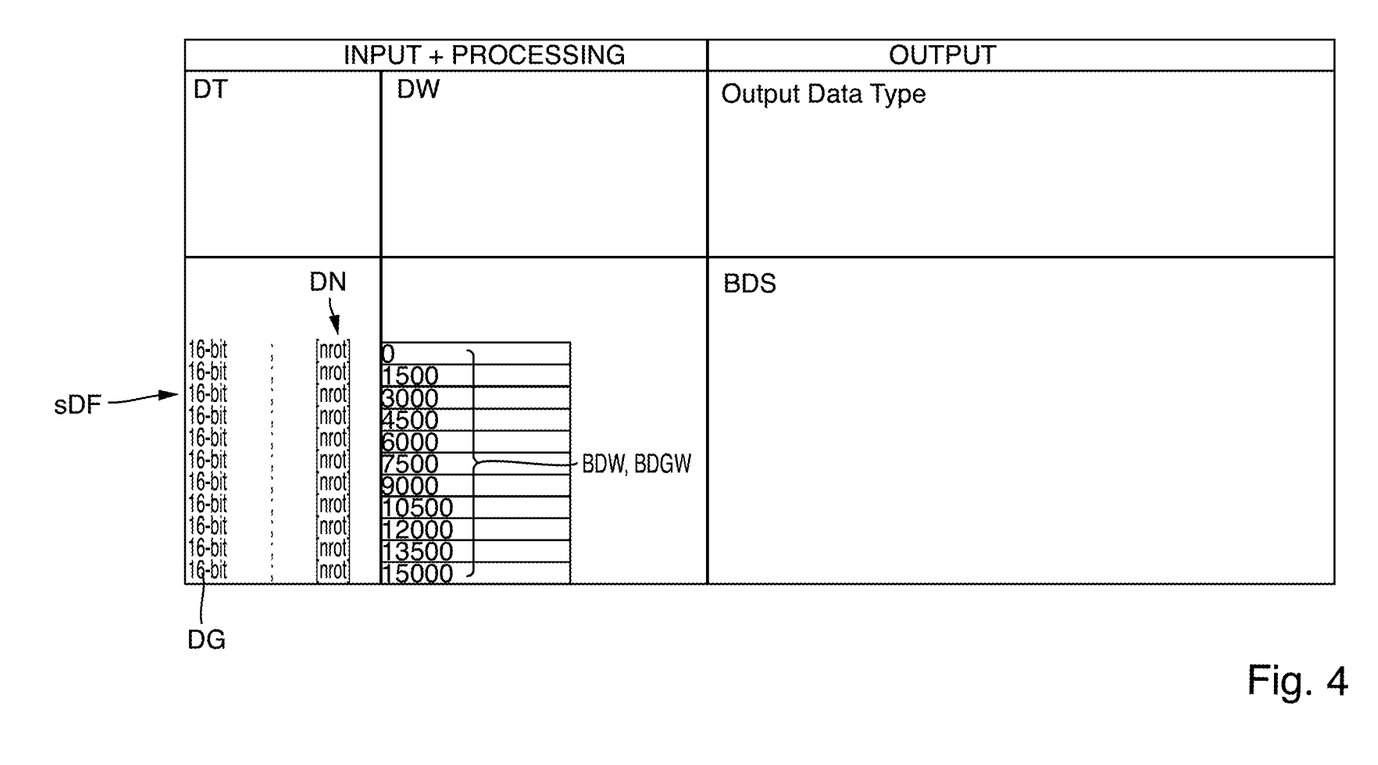
FIG. 4 shows an overview of a part of an item of type-specific configuration information for adapting the apparatus to the tool from FIG. 1.
Figure 5:
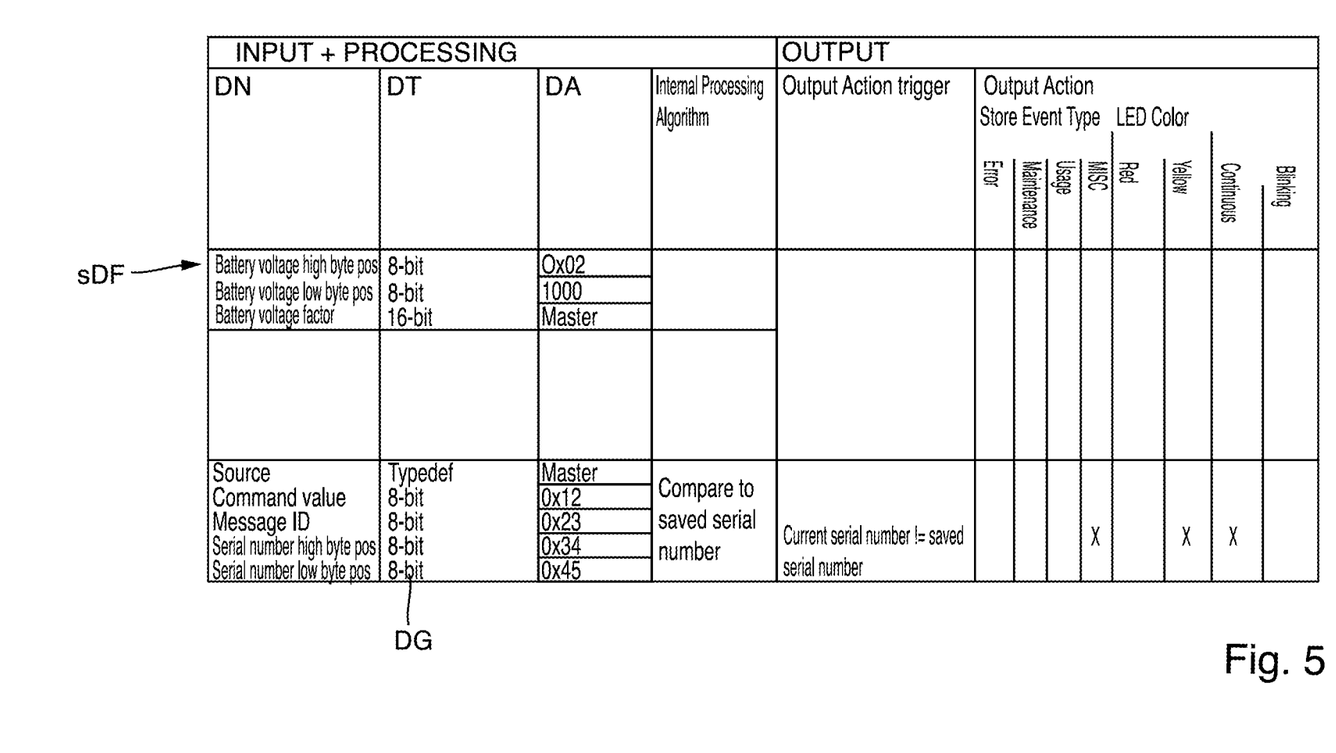
FIG. 5 shows a further overview of a further part of the type-specific configuration information from FIG. 4.

In detail, the configuration information KI for understanding has an item of information for finding and/or detecting the operating data BD of the tool 2, in particular in interface data SD of the rechargeable battery interface 5, in particular an item of information relating to a data address DA, a data name DN, a data type DT, a data value DW and/or a data size DG, as shown in FIGS. 4 and 5.

In addition, the configuration information KI for type-specific evaluation has an item of information relating to at least one type-specific operating data value BDW, in particular at least one type-specific operating data limit value BDGW, in particular for creating operating data statistics BDS and/or for detecting and/or storing a fault of the tool 2, in particular in the storage device 15, and/or for outputting and/or transmitting, in particular to the terminal 8, an item of evaluation information AI evaluated from the operating data BD, in particular by means of an output device 16, in particular a display 16', and/or a communication interface 17 of the apparatus 1.

Further additionally, the configuration information for type-specific storage has an item of information for storing or not storing operating data BD which cannot be understood and/or evaluated.

The method for operating the apparatus 1 in a type-dependent manner also has the step of: creating the operating data statistics BDS and/or detecting and/or storing the fault of the tool 2 and/or outputting and/or transmitting the evaluation information AI evaluated from the operating data BD by means of the apparatus 1.

Furthermore, the operating data BD have a speed nrot of the drive motor 7 of the tool 2, a motor current MS of the drive motor 7, a temperature T2 of the tool 2, in particular of the drive motor 7, a rechargeable battery voltage AS of the rechargeable battery 6 connected to the tool 2 captured by means of the tool 2, an item of status information ZI relating to the tool 2 and/or an item of fault information FI relating to the tool 2.

In the exemplary embodiment shown, the tool 2 is a saw 2". In alternative exemplary embodiments, the tool may be a pole pruner or hedge shears or a hedge cutter or a woodcutter or branch shears or a blower or a leaf blower or an aspirator or a leaf aspirator or a cleaning device or a high-pressure cleaner or a sweeper roller or a sweeper brush or a lawnmower or a brush cutter or a scarifier.

In detail, different items of the operating data BD mentioned above are differently relevant to the saw 2" and hedge shears or a blower, for example. Therefore, the operating data BD, in particular the operating data relevant to the respective type, are in the, in particular respective, type-specific data format sDF, and operating data which are irrelevant to the respective type are not in the type-specific data format, in particular. For example, the saw 2" is torque-controlled and the motor current MS is therefore relevant. The blower is speed-controlled and the speed is therefore relevant.

In addition, although the speed nrot is in the operating data BD of the saw 2" and the hedge shears or the blower, the type-specific operating data value BDW is different for the saw 2" and the hedge shears or the blower. For example, low numerical values of the speed nrot can be expected for the saw 2", but high numerical values can be expected for the hedge shears, and it is possible to take into account for the blower, by selecting the type-specific operating data value, in particular the type-specific operating data limit value, that the blower may also have power when idling. The operating data statistics BDS, for example in the form of a speed histogram, are therefore type-specific as evaluation information AI.

Furthermore, the type-specific operating data value BDW can define which event results in the output and/or transmission of the evaluation information AI. In particular, the evaluation information AI may have an item of information relating to a type of event. For example, the display 16' having a green LED 16", a yellow LED 16''' and a red LED 16'''' may output the information relating to the type of event using the colors green, yellow or red. Additionally or alternatively, the display 16' may output the evaluation information AI having the information relating to the type of event by permanently emitting light or flashing.

In particular, the identifier ID is in a non-type-specific data format uDF, in particular has a non-type-specific data address.

In addition, the identifier has a type number TN and/or a serial number SN. In the exemplary embodiment shown, the identifier ID is the serial number SN. The serial number SN has the type number TN.

Furthermore, the method for adapting the apparatus 1 to the tool 2 has the steps of: storing the captured identifier ID, or an item of identifier information determined by means of the apparatus 1 on the basis of the captured identifier ID, in the apparatus 1, in particular in the storage device 15. Repeatedly capturing an, in particular the, identifier ID of a, in particular the, motor-driven tool 2 from the set of different types of motor-driven tools 2 by means of the apparatus 1, wherein the apparatus 1 is arranged on the tool 2. Comparing the repeatedly captured identifier ID or an item of identifier information determined by means of the apparatus 1 on the basis of the repeatedly captured identifier ID and the stored identifier ID or the stored identifier information with one another by means of the apparatus 1, in particular the evaluation device 14. Outputting and/or transmitting, in particular to the terminal 8, an item of comparison result information VI on the basis of a result of the comparison by means of the apparatus 1, in particular the output device 14 and/or the communication interface 17, as shown in FIG. 5.

In particular, the comparison result information VI may be output and/or transmitted, in particular by means of the yellow LED 16''' permanently emitting light, if the result of the comparison is that the repeatedly captured identifier or the identifier information determined on the basis of the repeatedly captured identifier and the stored identifier or the stored identifier information are not the same.

In the exemplary embodiment shown, the apparatus 1 has a user-actuatable operating element 30. The output, in particular of the evaluation information AI and/or of the comparison result information VI, is carried out on the condition that the operating element 30 has been actuated.

Step b) also comprises: transmitting the captured identifier ID, or an, in particular the, item of identifier information determined by means of the apparatus 1 on the basis of the captured identifier ID, from the apparatus 1 to the terminal 8 and from the terminal 8 to the database 3.

Step b) additionally comprises: transmitting the type-specific configuration information KI from the database 3 to the terminal 8 and from the terminal 8 to the apparatus 1.

In particular, step b) comprises: transmitting the captured identifier ID, or an, in particular the, item of identifier information determined by means of the apparatus 1 on the basis of the captured identifier ID, from the apparatus 1 to the database 3, in particular by means of the communication interface 17 and/or the terminal 8. Step b) additionally comprises: determining the type-specific configuration information KI, in particular from a set of different items of type-specific configuration information KI, on the basis of the transmitted identifier ID or the transmitted identifier information by means of the database 3. Further additionally, step b) comprises: transmitting the determined type-specific configuration information KI from the database to the apparatus 1, in particular by means of the terminal 8 and/or the communication interface 17. Further additionally, step b) comprises: implementing the type-specific configuration information KI by means of the apparatus 1.

Furthermore, the capture device 11, the processing device 12, in particular the understanding device 13, the evaluation device 14, the storage device 15, the output device 16, the communication interface 17 and/or the operating element 30 are electrically connected to one another.

The apparatus 1 also has an electrical energy store 18, in particular in the form of a battery 18'. The electrical energy store 18 is designed to supply, in particular supplies, the capture device 11, the processing device 12, in particular the understanding device 13, the evaluation device 14, the storage device 15, the output device 16 and/or the communication interface 17 with electrical power.

In the exemplary embodiment shown, the apparatus 1 may be additionally designed to be supplied, in particular may be supplied, with electrical power from the rechargeable battery 6 by means of the cable 4.

Furthermore, the terminal 8 may be designed to output, in particular may output, in particular in a manner which can be perceived by a user, the received evaluation information AI and/or the received comparison result information VI. Additionally or alternatively, the terminal 8 may be any data-processing device which may have a wireless communication interface which may be designed for wireless transmission or communication with the communication interface 17 of the apparatus 1.

As the exemplary embodiments shown and explained above make clear, the invention provides a method for adapting an apparatus to a motor-driven tool from a set of different types of motor-driven tools, in particular wherein the method has improved properties. Furthermore, the invention provides a method for operating an apparatus in a type-dependent manner, wherein the apparatus is arranged on a motor-driven tool from a set of different types of motor-driven tools, wherein the method comprises such a method for adapting the apparatus to the tool, an apparatus for adaptation to a motor-driven tool from a set of different types of motor-driven tools and a system having such an apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adaptation of an apparatus to a motor-driven tool from different types of motor-driven tools, wherein the apparatus is arranged on the motor-driven tool, the method comprising:
   a) capturing an identifier of the motor-driven tool;
   b) receiving, at the apparatus, an item of type-specific configuration information selected from a set of different items of type-specific configuration information that are each specific to corresponding different types of motor-driven tools from a database based on the captured identifier, wherein
      each of the items of type-specific configuration information configure the apparatus to find and/or detect type-specific operating data received from the motor-driven tool having a type-specific data format; and
   c) processing the type-specific operating data of the motor-driven tool in a type-specific manner based on the item of type-specific configuration information, the processing comprising:
      interpreting the type-specific operating data in the type-specific data format, or
      evaluating the type-specific operating data.

2. The method according to claim 1, wherein the apparatus is configured to be separate from the motor-driven tool.

3. The method according to claim 1, wherein the identifier has a type number and/or a serial number.

4. The method according to claim 1, wherein the identifier is a type number or a serial number.

5. The method according to claim 1, wherein the capturing of the identifier occurs via a cable connecting the apparatus and the motor- driven tool.

6. The method according to claim 5, further comprising: transmitting the captured identifier and the type-specific operating data between the motor-driven tool and a rechargeable battery via a communication line of a rechargeable battery interface that connects the motor-driven tool to the rechargeable battery, wherein
   the cable is connected to the rechargeable battery interface.

7. The method according to claim 1, wherein the item of type-specific configuration information comprises at least one of:
   a first item of information comprising:
      a type-specific operating data value for creating operating data statistics, detecting and/or storing a fault of the motor-driven tool, and/or outputting and/or transmitting an item of evaluation information obtained from the type- specific operating data; or
      a second item of information to configure storing or not storing the type-specific operating data that cannot be interpreted and/or evaluated.

8. The method according to claim 1, wherein the type-specific operating data comprises at least one of:
   a speed of a drive motor of the motor-driven tool,
   a motor current of the drive motor,
   a temperature of the motor-driven tool,
   a voltage of a rechargeable battery connected to the motor-driven tool captured using the motor-driven tool,
   status information of the motor-driven tool, or
   fault information of the motor-driven tool.

9. The method according to claim 1, wherein
   the motor-driven tool is a saw, a pole pruner, hedge shears, a hedge cutter, a woodcutter, branch shears, a blower, a leaf blower, an aspirator, a leaf aspirator, a cleaning device, a high-pressure cleaner, a sweeper roller, a sweeper brush, a lawnmower, a brush cutter or a scarifier.

10. The method according to claim 1, further comprising:
    storing the captured identifier, or a first identifier information determined by the apparatus based on the captured identifier, in the apparatus;
    repeatedly capturing, by the apparatus, the identifier of the motor-driven tool from the different types of motor-driven tools, wherein
       the apparatus is arranged on the motor-driven tool;
    comparing the repeatedly captured identifier or a second identifier information determined by the apparatus based on the repeatedly captured identifier with the stored captured identifier or the stored first identifier information by the apparatus; and
    outputting and/or transmitting a result of the comparing by the apparatus.

11. The method according to claim 1, further comprising:
    transmitting the captured identifier, or identifier information determined by the apparatus based on the captured identifier, from the apparatus to a mobile terminal and then from the mobile terminal to the database; and/or
    receiving the item of type-specific configuration information from the database at the mobile terminal and then receiving from the mobile terminal at the apparatus.

12. The method according to claim 1, wherein the received item of type-specific configuration information further defines:
    a data address,
    a data name,
    a data type,
    a data value, and/or
    a data size.

13. The method according to claim 1, wherein
    the motor-driven tool is a first motor-driven tool of the different types of motor-driven tools; and
    the received item of type-specific configuration information includes a first information item relevant to the first motor-driven tool, and omits a second information item relevant to a second motor-driven tool of the different types of motor-driven tools.

14. A method for operating an apparatus in a type-dependent manner, wherein the apparatus is arranged on a motor-driven tool from different types of motor-driven tools, the method comprising:
    a) capturing an identifier of the motor-driven tool;
    b) receiving, at the apparatus, an item of type-specific configuration information selected from a set of different items of type-specific configuration information that are each specific to corresponding different types of motor-driven tools from a database based on the captured identifier, wherein
       each of the items of type-specific configuration information configure the apparatus to find and/or detect type-specific operating data received from the motor-driven tool having a type-specific data format; and c) capturing the type-specific operating data of the motor-driven tool and processing the captured type-specific operating data in a type-specific manner by the apparatus based on the item of type-specific configuration information, the processing comprising:
  interpreting the type-specific operating data in the type-specific data format, or
  evaluating the type-specific operating data.

15. An apparatus for adaptation to a motor-driven tool from different types of motor-driven tools,
  the apparatus is configured for arrangement on the motor-driven tool, and
  the apparatus comprises:
    a capture device configured to capture an identifier of the motor-driven tool, and
    a communication interface circuit configured to initiate a transmission of an item of type-specific configuration information, which is selected from a set of different items of type-specific configuration information that are each specific to corresponding different types of motor-driven tools, to the apparatus based on the captured identifier, wherein each of the items of type-specific configuration information configure the apparatus to find and/or detect type-specific operating data received from the motor-driven tool having a type-specific data format; and
    an evaluation device configured to process the type-specific operating data of the motor-driven tool in a type-specific manner based on the item of type-specific configuration information, wherein
    the evaluation device is configured to process the type-specific operating data by:
      interpreting the type-specific operating data in the type-specific data format, or
      evaluating the type-specific operating data.

16. A system, comprising:
  the apparatus according to claim 15; and
  a database, wherein the system is configured to transmit the item of type-specific configuration information from the database based on the captured identifier.

17. The system according to claim 16, further comprising the motor-driven tool.

* * * * *